J. RATZLAFF & D. E. REED.
MOTOR CAR.
APPLICATION FILED FEB. 15, 1913.
1,091,962.
Patented Mar. 31, 1914.
2 SHEETS—SHEET 1.
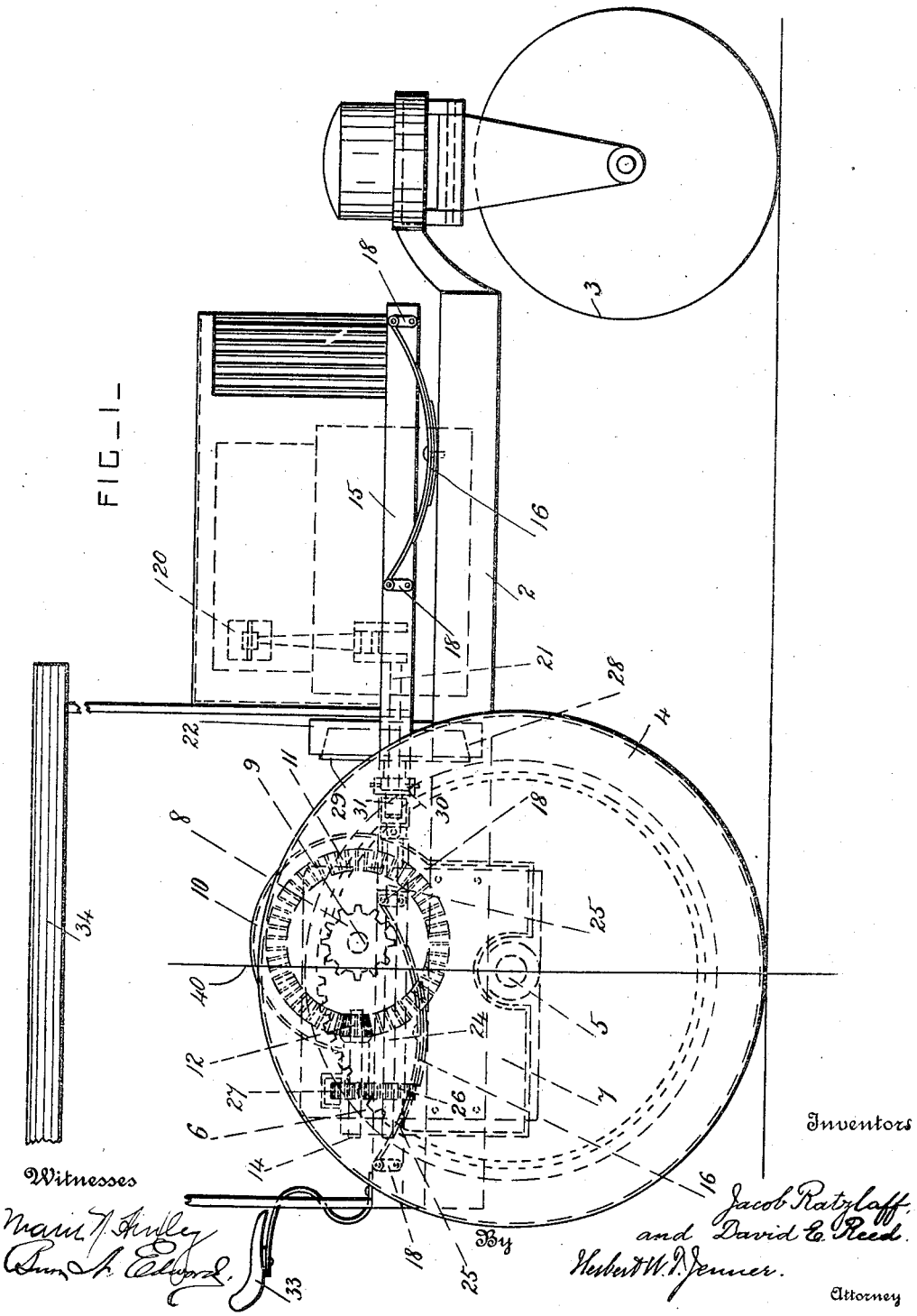

J. RATZLAFF & D. E. REED.
MOTOR CAR.
APPLICATION FILED FEB. 15, 1913.
1,091,962.
Patented Mar. 31, 1914.
2 SHEETS—SHEET 2.
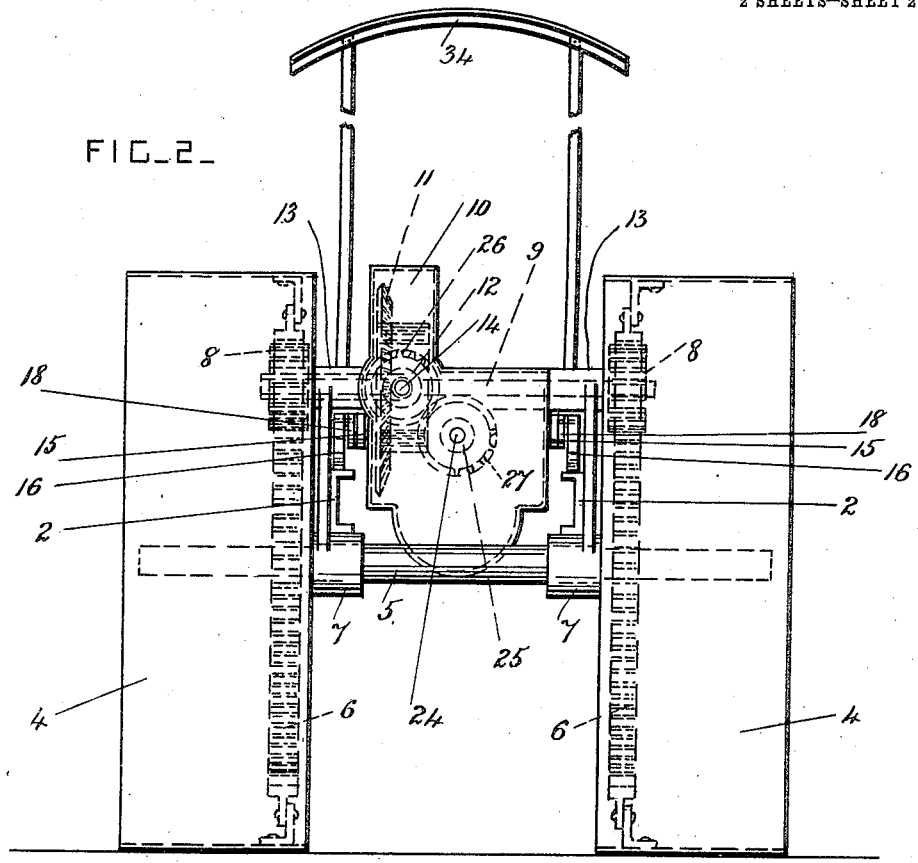
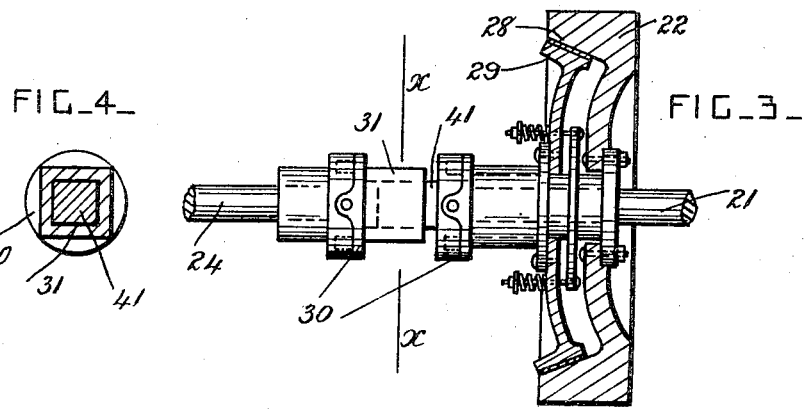

UNITED STATES PATENT OFFICE.

JACOB RATZLAFF AND DAVID E. REED, OF PORTLAND, OREGON.

MOTOR-CAR.

1,091,962.  Specification of Letters Patent.  Patented Mar. 31, 1914.

Application filed February 15, 1913. Serial No. 748,686.

*To all whom it may concern:*

Be it known that we, JACOB RATZLAFF and DAVID E. REED, citizens of the United States, residing at Portland, in the county of Multnomah and State of Oregon, have invented certain new and useful Improvements in Motor-Cars; and we do hereby declare the following to be a full, clear, and exact description of the invention, such as will enable others skilled in the art to which it appertains to make and use the same.

This invention relates to motor cars, such as traction engines and automobiles which are driven by internal combustion engines; and it consists in the novel construction and combination of the parts hereinafter fully described and claimed whereby the motor is supported upon springs and whereby steady driving and steering is assured.

In the drawings, Figure 1 is a side view of a motor car constructed according to this invention, many parts being omitted, for clearness. Fig. 2 is an end view of the same. Fig. 3 is a detail plan view of the universal coupling or joint. Fig. 4 is a cross-section taken on the line $x$—$x$ in Fig. 3.

A main frame 2 is provided, and the steering wheel, or wheels, 3 is arranged at the front end of this frame so that it supports its front end. The steering devices are of any approved construction, and do not form a part of the present invention. The main road wheels 4 are mounted on the end portions of a shaft 5, and are driven by means of internal toothed wheels 6 secured to them. The shaft 5 is supported by brackets 7 which are rigidly secured to the main frame 2. Toothed pinions 8 are secured on the end portions of a countershaft 9, which is formed in sections, and these pinions gear into the internal toothed wheels. The sections of the countershaft are coupled together by means of a compensating gear of any approved construction inclosed in a casing 10. The compensating gear is provided with a beveled toothed wheel 11 which gears into a beveled toothed pinion 12 also inclosed in the casing 10. The pinion 12 is secured on a driving shaft 14 which projects from the casing. The countershaft is journaled in bearings 13 which are rigidly secured to the main frame 2.

An auxiliary frame 15 is provided, and is preferably arranged above the main frame 2. Springs 16 are interposed between the two frames, and these springs are preferably leaf springs, the middle portions of which are secured to the main frame. The end portions of the springs 16 are connected to the auxiliary frame by pivoted links 18, and the springs 16 are arranged at the sides of the frames, so that the auxiliary frame may move up and down freely, and may also be free to vibrate to a limited extent longitudinally.

The motor 20 is of any approved construction, and it is secured on the front end portion of the auxiliary frame with its radiator arranged to the front. This motor is provided with a crankshaft 21 having a heavy fly-wheel 22 secured on it and arranged at its rear part. The crankshaft of the motor is preferably arranged centrally of the frames, between the main road wheels, and below the countershaft, and a longitudinal shaft 24 is provided and is arranged substantially in line with the crankshaft. The longitudinal shaft 24 is journaled in bearings 25 which are rigidly secured to the main frame 2, and it is operatively connected with the driving shaft 14 of the compensating gear by intergearing toothed wheels 26 and 27, or by any equivalent intermediate driving devices. The crankshaft has a clutch member 28 secured on it, and preferably formed inside the rim of the fly-wheel. A slidable clutch member 29 is also mounted concentric with the crankshaft, and is operated by any suitable lever mechanism, which is not shown. A universal coupling or joint 30 of any approved construction is provided for operatively connecting the clutch member 29 with the longitudinal shaft 24, and this coupling has a rectangular slidable or telescopic portion 31 which permits the clutch member 29 to be slid longitudinally of the crankshaft. The universal coupling or joint transmits the rotary movement of the crankshaft to the longitudinal shaft 24, and permits the motor to vibrate vertically and longitudinally. The telescopic portion or slip-joint 31 preferably consists of a rectangular sleeve which is connected to the shaft 24, and in which a rectangular projection 41 is longitudinally slidable. The part 41 is connected to the engine crankshaft 21 and slides longitudinally with it as the engine and the auxiliary frame vibrate longitudinally on the links 18. As the fly-wheel vibrates with the motor, it is not liable to bend the crankshaft, and the crankshaft bearings do not become unduly heated as the crankshaft is not subjected to strains by the roughness of the road over which the motor car is driven. When the car is used as a tractor to draw heavy loads, and the crankshaft of the engine is arranged longitudinally of the car, the crankshaft is very liable to be bent and injured by the effect on its flywheel of the longitudinal vibrations to which the main frame is subjected by the intermittent character of the longitudinal strains in hauling the load, unless the motor is supported by the links 18 and the springs 16, which permit the motor with its flywheel and auxiliary frame to vibrate longitudinally of the main frame as well as vertically.

A seat 33 for the driver is provided and is secured to the rear end portion of the auxiliary frame behind the driving mechanism. A canopy 34 extends over the seat and the driving mechanism, and is also supported from the auxiliary frame.

The countershaft 9 is arranged above the road wheel shaft 5 and a little in front of a vertical line 40 drawn through the road wheel shaft. When arranged in this manner, and the motor car is driven forward, the pressure of the pinions on the teeth of the internal toothed wheels 6 is downward and between the main road wheels and the steering wheel or wheels. This causes the steering wheel or wheels to be pressed against the ground mechanically, as well as engaging with the ground by gravity, and a good frictional contact with the ground is assured, so that the motor car can be steered effectively.

What we claim is:

1. The combination, with a main frame provided with road wheels, of an auxiliary frame, springs and links supporting the auxiliary frame from the main frame and permitting the auxiliary frame to vibrate vertically and also longitudinally of the main frame, a motor provided with a crankshaft arranged longitudinally of the main frame, said motor being secured to the auxiliary frame, traction mechanism carried by the main frame, and means for operatively connecting the traction mechanism with the crankshaft.

2. The combination, with a main frame provided with road wheels, of an auxiliary frame, leaf springs secured to the main frame and arranged longitudinally thereof, links pivotally supporting the auxiliary frame from the leaf springs and permitting it to oscillate longitudinally of the main frame, a motor provided with a crankshaft arranged longitudinally of the main frame, said motor being secured to the auxiliary frame, traction mechanism carried by the main frame, and means for operatively connecting the traction mechanism with the crankshaft.

3. The combination, with a main frame provided with road wheels, of an auxiliary frame, springs and links supporting the auxiliary frame from the main frame and permitting the auxiliary frame to vibrate vertically and also longitudinally of the main frame, a motor provided with a crankshaft arranged longitudinally of the main frame, said motor being secured to the auxiliary frame, traction mechanism carried by the main frame and provided with a driving shaft arranged longitudinally of the main frame, and a universal coupling and a slip joint operatively connecting the said longitudinal shaft with the motor crankshaft.

4. The combination, with a main frame, an axle arranged crosswise of the main frame, rear road wheels on the said axle, and steering devices at the front portion of the main frame; of internal toothed wheels secured to the rear road wheels, a countershaft formed in sections and carried by the main frame and arranged above and in front of the axis of the rear road wheels, toothed pinions secured on the sections of the countershaft and gearing into the said internal toothed wheels, driving mechanism operatively connected with the sections of the countershaft and provided with a shaft arranged longitudinally of the frame below the countershaft, and a motor provided with a crankshaft arranged substantially in line with the longitudinal shaft and operatively connected with it.

In testimony whereof we affix our signatures, in presence of two witnesses.

JACOB RATZLAFF.
DAVID E. REED.

Witnesses:
JOHN DICK,
E. M. JANTZ.